US010908633B2

(12) United States Patent
Rizzi et al.

(10) Patent No.: US 10,908,633 B2
(45) Date of Patent: Feb. 2, 2021

(54) PEDAL UNIT FOR A VEHICLE, PARTICULARLY A UTILITY VEHICLE

(71) Applicant: KNORR-BREMSE Systeme fuer Nutzfahrzeuge GmbH, Munich (DE)

(72) Inventors: Stefano Rizzi, Lissone (IT); Giorgio Andreetta, Biassono (IT)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 6 days.

(21) Appl. No.: 16/238,669

(22) Filed: Jan. 3, 2019

(65) Prior Publication Data

US 2019/0138045 A1   May 9, 2019

Related U.S. Application Data

(63) Continuation of application No. PCT/EP2017/065042, filed on Jun. 20, 2017.

(30) Foreign Application Priority Data

Jul. 4, 2016   (DE) ........................ 10 2016 112 188

(51) Int. Cl.
  *G05G 1/44*   (2008.04)
  *B60K 23/02*   (2006.01)
  (Continued)

(52) U.S. Cl.
  CPC ............... *G05G 1/44* (2013.01); *B60K 23/02* (2013.01); *B60K 26/02* (2013.01); *B60T 7/04* (2013.01);
  (Continued)

(58) Field of Classification Search
  CPC ............ G05G 1/30; G05G 1/44; G05G 1/445; G05G 1/46; G05G 1/50; B60T 7/04; B60T 7/06; F02D 11/02; F16C 11/04; Y10T 74/20528; Y10T 74/20888; B60K 26/02; B60Y 2304/07
  See application file for complete search history.

(56) References Cited

U.S. PATENT DOCUMENTS 4,109,529 A * 8/1978 Niklaus ..................... B60T 7/04
  188/106 R
5,078,024 A * 1/1992 Cicotte ..................... B60T 7/04
  74/512

(Continued)

FOREIGN PATENT DOCUMENTS

CN           1408575 A      4/2003
CN         104272212 A      1/2015
(Continued)

OTHER PUBLICATIONS

Wikipedia webpage (https://en.wikipedia.org/wiki/Oval), section "In common speech" (Year: 2020).*

(Continued)

*Primary Examiner* — Prasad V Gokhale
(74) *Attorney, Agent, or Firm* — Crowell & Moring LLP

(57) ABSTRACT

A pedal unit for a vehicle, particularly a utility vehicle, has at least one pedal shaft, at least one control cam, at least one pedal and at least one lever arm. The pedal is rigidly secured to the pedal shaft by the lever arm. The control cam is also rigidly secured to the pedal shaft.

6 Claims, 6 Drawing Sheets

(51) Int. Cl.
*B60T 7/06* (2006.01)
*B60T 7/04* (2006.01)
*B60K 26/02* (2006.01)
*G05G 1/46* (2008.04)

(52) U.S. Cl.
CPC ............... *B60T 7/06* (2013.01); *G05G 1/46* (2013.01); *B60Y 2200/14* (2013.01); *B60Y 2304/07* (2013.01)

(56) References Cited

U.S. PATENT DOCUMENTS

| | | | |
|---|---|---|---|
| 5,497,677 | A | 3/1996 | Baumann et al. |
| 6,070,489 | A * | 6/2000 | Ananthasivan ......... B60T 7/065 74/512 |
| 6,446,525 | B1 | 9/2002 | Borchers |
| 6,612,200 | B1 * | 9/2003 | Rixon ................. B60R 21/09 403/151 |
| 2002/0184749 | A1 | 12/2002 | Burgstaler et al. |
| 2006/0248978 | A1 * | 11/2006 | Prat Terradas ......... B60T 11/08 74/560 |
| 2007/0209471 | A1 | 9/2007 | Nunez |
| 2009/0071285 | A1 * | 3/2009 | Lauderbaugh ........... G05G 1/30 74/512 |
| 2018/0170325 | A1 * | 6/2018 | Christoff ............. B60T 7/042 |
| 2019/0004560 | A1 * | 1/2019 | Strom ................ B60T 7/06 |

FOREIGN PATENT DOCUMENTS

| | | |
|---|---|---|
| CN | 207842910 U | 9/2018 |
| DE | 2 138 952 A1 | 2/1973 |
| DE | 100 40 043 C1 | 8/2001 |
| DE | 699 01 991 T2 | 4/2003 |
| DE | 102 32 212 A1 | 1/2004 |
| DE | 10 2004 018 266 A1 | 11/2005 |
| DE | 10 2012 010 674 A1 | 12/2013 |
| DE | 20 2014 101 559 U1 | 6/2014 |
| EP | 0 659 606 A1 | 6/1995 |
| EP | 0 788 931 A2 | 8/1997 |
| EP | 1 749 732 A1 | 2/2007 |
| GB | 1 365 202 A | 8/1974 |
| JP | 8-30346 A | 2/1996 |
| JP | 2000-148271 A | 5/2000 |
| JP | 2002-512392 A | 4/2002 |
| JP | 2009-169818 A | 7/2009 |

OTHER PUBLICATIONS

International Search Report (PCT/ISA/210) issued in PCT Application No. PCT/EP2017/065042 dated Aug. 28, 2017 with English translation (six (6) pages).

German-language Written Opinion (PCT/ISA/237) issued in PCT Application No. PCT/EP2017/065042 dated Aug. 28, 2017 (seven (7) pages).

German-language Office Action issued in counterpart German Application No. 10 2016 112 188.6 dated Jun. 24, 2017 (seven (7) pages).

International Preliminary Report on Patentability (PCT/IB/326 & PCT/IB/373) issued in PCT Application No. PCT/EP2017/065042 dated Jan. 17, 2019, including English translation of document C2 (German-language Written Opinion (PCT/ISA/237)) previously filed on Jan. 3, 2019 (nine pages).

Japanese Office Action issued in Japanese counterpart application No. 2018-568765 dated Sep. 30, 2019, with partial English translation (Six (6) pages).

Japanese Office Action issued in Japanese application No. 2018-568765 dated May 28, 2020, with partial English translation (Eight (8) pages).

Chinese Office Action issued in Chinese application No. 201780041960.4 dated Aug. 4, 2020, with partial English translation (Ten (10) pages).

\* cited by examiner

PEDAL UNIT FOR A VEHICLE, PARTICULARLY A UTILITY VEHICLE

CROSS REFERENCE TO RELATED APPLICATIONS

This application is a continuation of PCT International Application No. PCT/EP2017/065042, filed Jun. 20, 2017, which claims priority under 35 U.S.C. § 119 from German Patent Application No. 10 2016 112 188.6, filed Jul. 4, 2016, the entire disclosures of which are herein expressly incorporated by reference.

BACKGROUND AND SUMMARY OF THE INVENTION

The present invention relates to a pedal unit for a vehicle, especially a utility vehicle, with at least one pedal shaft, at least one control cam, at least one pedal and at least one lever arm.

Pedal units for vehicles are already known from the prior art in connection with driver work stations for utility vehicles.

Thus, for example, EP 1 749 732 A1 discloses a driver work station for a utility vehicle, wherein the driver work station comprises multiple individual components and the utility vehicle has a module opening on the vehicle frame.

From EP 0 659 606 A1 there is known a gas pedal mechanism for a motor vehicle, wherein a pedal plate is pivotably mounted on a pedal holder in the form of a housing and is connected to a pedal plate connected actuating device, namely a pedal.

DE 20 2014 101 559 U1 discloses a foot pedal for activating a machine.

Pedal units for vehicles, especially for utility vehicles, if they are mechanically designed, might have a very complex and also very bulky mechanism, which may make the assembly process difficult. This may also result in such a pedal unit requiring comparatively large structural space.

Therefore, the problem which the present invention proposes to solve is to develop a pedal unit of the kind mentioned at the outset in advantageous manner, especially so that the pedal unit can be mounted more easily.

This problem is solved according to the invention by a pedal unit for a vehicle with at least one pedal shaft, at least one control cam, at least one pedal and at least one lever arm, wherein the pedal is firmly secured by way of the lever arm to the pedal shaft and wherein the control cam is also firmly secured to the pedal shaft.

The invention is based on the fundamental notion that the pedal unit is designed as an integrated component, so that it can be installed with few manual operations. This is accomplished in that the components of pedal, pedal shaft, control cam and lever arm are firmly secured to the pedal shaft. The fact that the components of pedal, pedal shaft, control cam and lever arm are firmly secured to the pedal shaft makes it easier to handle this portion of the pedal unit, because now it is not necessary to assemble and install multiple parts, but rather only one part needs to be mounted accordingly.

The vehicle may be, for example, a utility vehicle, such as a truck or the like.

Furthermore, a bearing bushing is arranged at one end of the pedal shaft. By means of the bearing bushing, the corresponding end of the pedal shaft can be mounted, especially rotatably mounted, to avoid a costly machining of the pedal shaft. Thus, for example, it is possible that the pedal shaft or corresponding mating pieces need not be provided with fits of narrow tolerance in a costly manner, since this can be accomplished by means of bearing bushings and thus by standard parts, for example. In this way, the manufacturing costs can be reduced.

Moreover, the pedal unit further comprises a pedal plate with a first shaft mount and a second shaft mount, wherein the pedal shaft is secured by way of the first and second shaft mount on the pedal plate. By means of the shaft mounts, a supporting of the pedal shaft is possible. In particular, the control cam is actuated by treading on the pedal, so that the lever arm and control cam are pivoted, namely about the longitudinal axis of the pedal shaft, which is rotatably mounted in the first shaft mount and second shaft mount.

It may be provided that the first shaft mount has an opening with a cross section that is larger than the cross section of a first pedal shaft bearing section of the pedal shaft, by which it is introduced into the first shaft mount during the assembly process. This enables a simple installation of the fully assembled pedal shaft, since in this way the pedal shaft can be inserted into the opening of the first shaft mount with an angle of attack or engagement greater than zero.

The cross section of the opening of the first shaft mount may be oval and/or oblong. Furthermore, alternatively or additionally, it may be provided that the pedal shaft with the first pedal shaft bearing section can be introduced at a slant into the opening. In this way, it becomes possible to place the pedal shaft between the first shaft mount and the second shaft mount and to introduce the pedal shaft at first into the opening of the first shaft mount and then to be able to orient it in the opening of the first shaft mount by swiveling it such that it can also be inserted into the second shaft mount.

The first pedal shaft bearing section of the pedal shaft in the mounted condition of the pedal unit can be held by way of an insert bushing in the opening of the first shaft mount. In this way, it becomes easily possible to even out accordingly the different cross sections of openings of the first shaft mount and of the first pedal shaft bearing section of the pedal shaft, so that the pedal shaft is advisedly rotatably mounted in the first shaft mount.

Furthermore, it may be provided that the second shaft mount comprises an opening, which forms a fit with a second pedal shaft bearing section of the pedal shaft. It is also contemplated for the fit to be formed such that the bearing bushing can be installed here. Basically, however, it is also possible not to install any bearing bushing at all in the opening of the second shaft mount and instead for the pedal shaft to rotate directly in the opening.

In particular, it may be provided that the fit is formed by a bore, especially a bore with a circular cross section. In this way, an easy fabrication is provided, at the same time as an efficient assembly process and the desired functionality.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
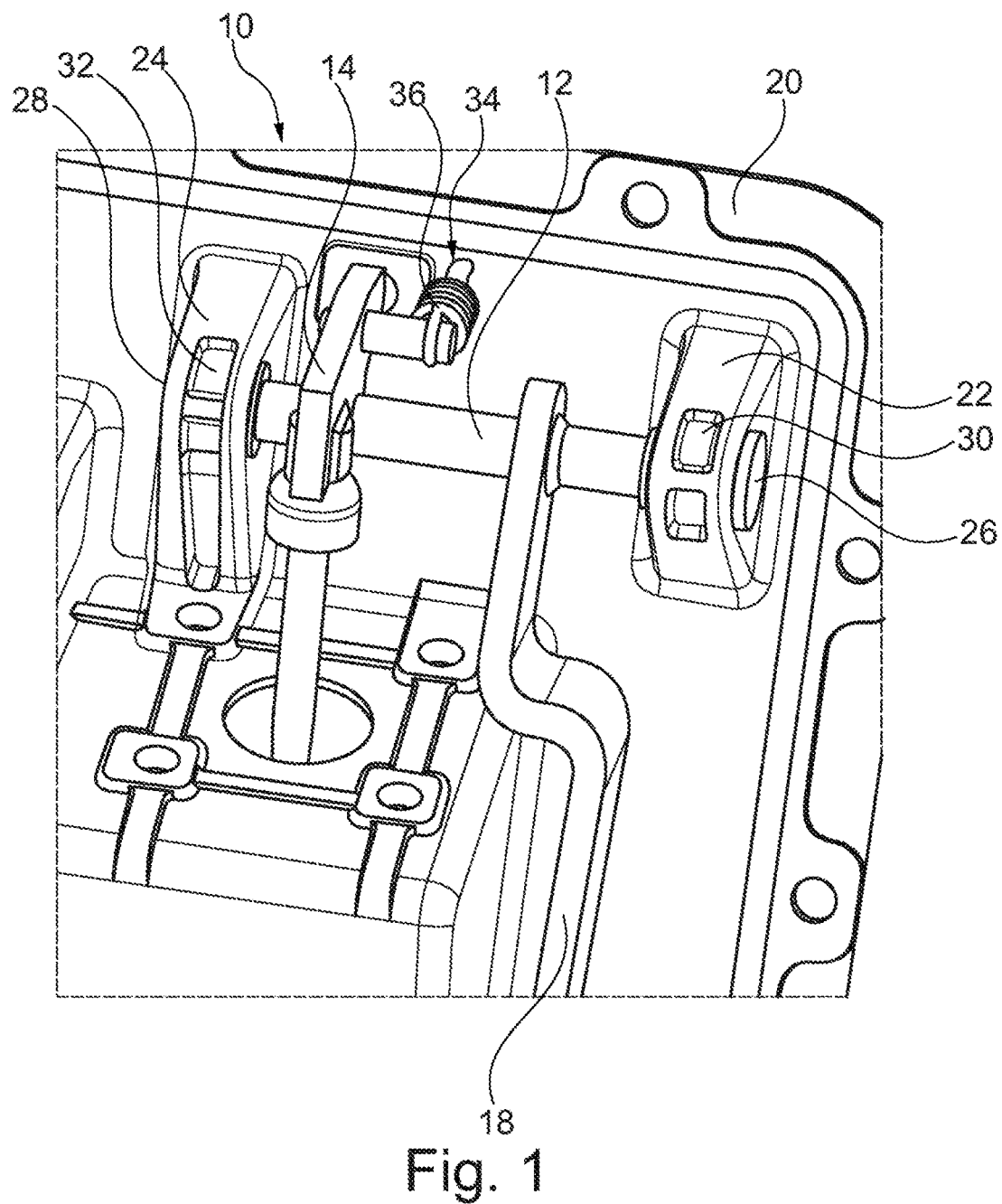
FIG. 1 is a perspective view of an exemplary embodiment of a pedal unit for a vehicle according to the invention.

FIG. 1 shows in perspective view an exemplary embodiment of a pedal unit 10 according to the invention for a vehicle, here, for a utility vehicle.

Figure 2:
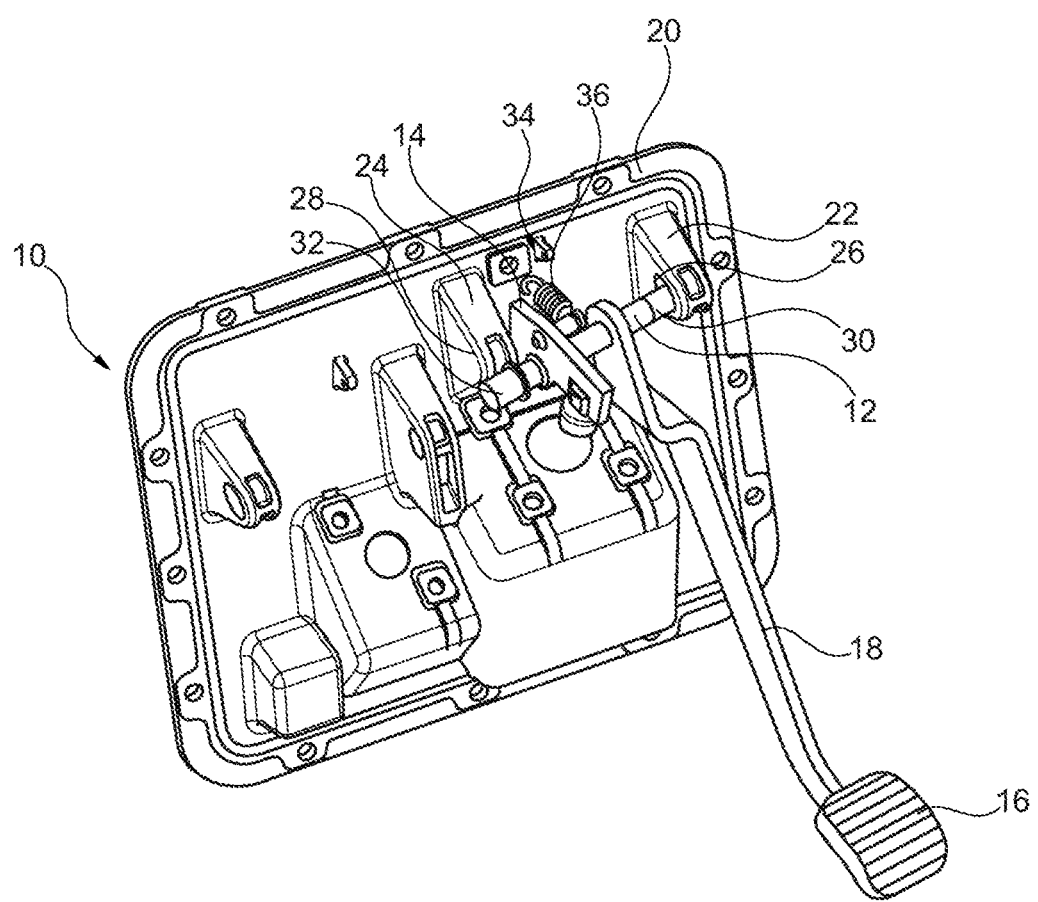
FIG. 2 is a perspective view of the assembly process for the pedal unit of FIG. 1.
Figure 3:
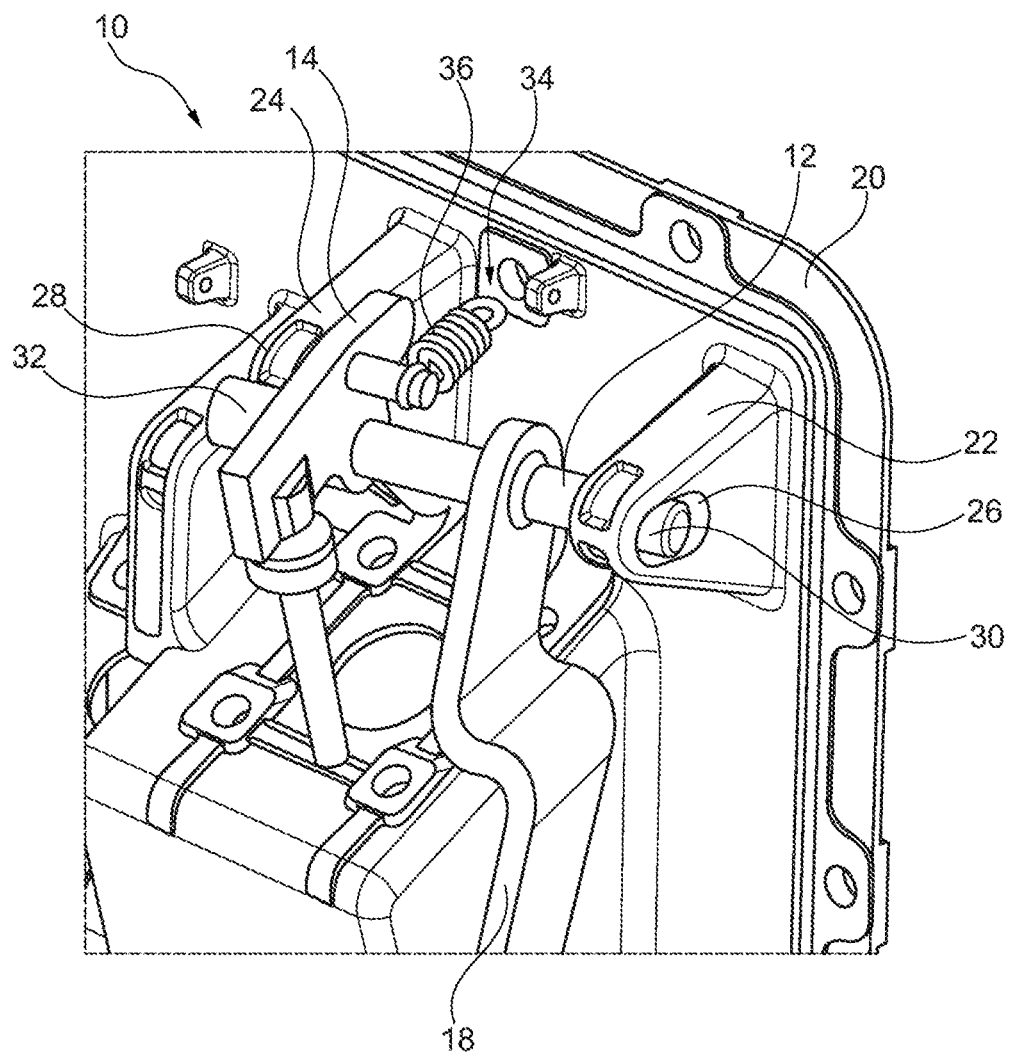
FIG. 3 is a further perspective view of the assembly process for the pedal unit of FIG. 1.
Figure 4:
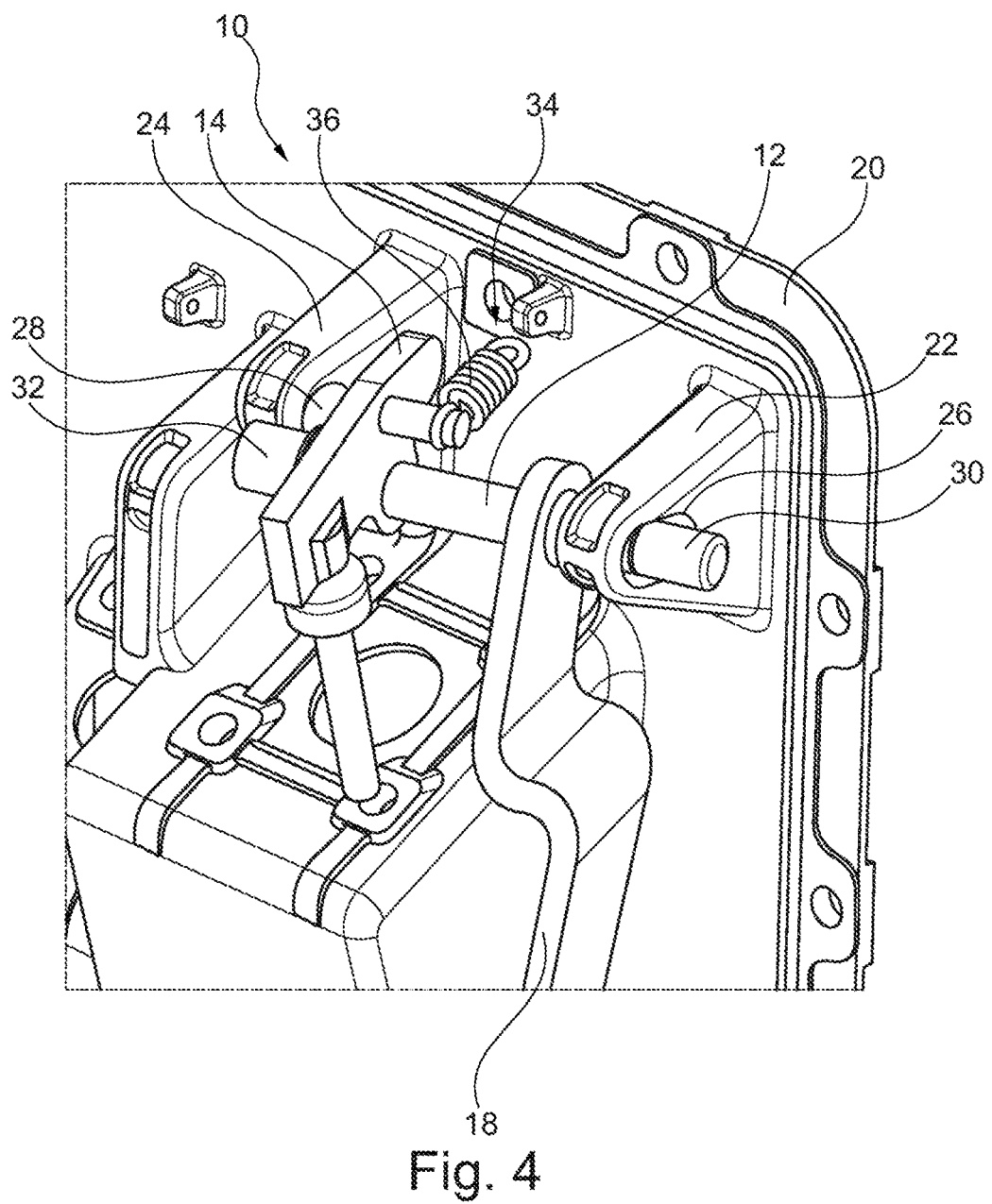
FIG. 4 is a further perspective view of the assembly process for the pedal unit of FIG. 1.
Figure 5:
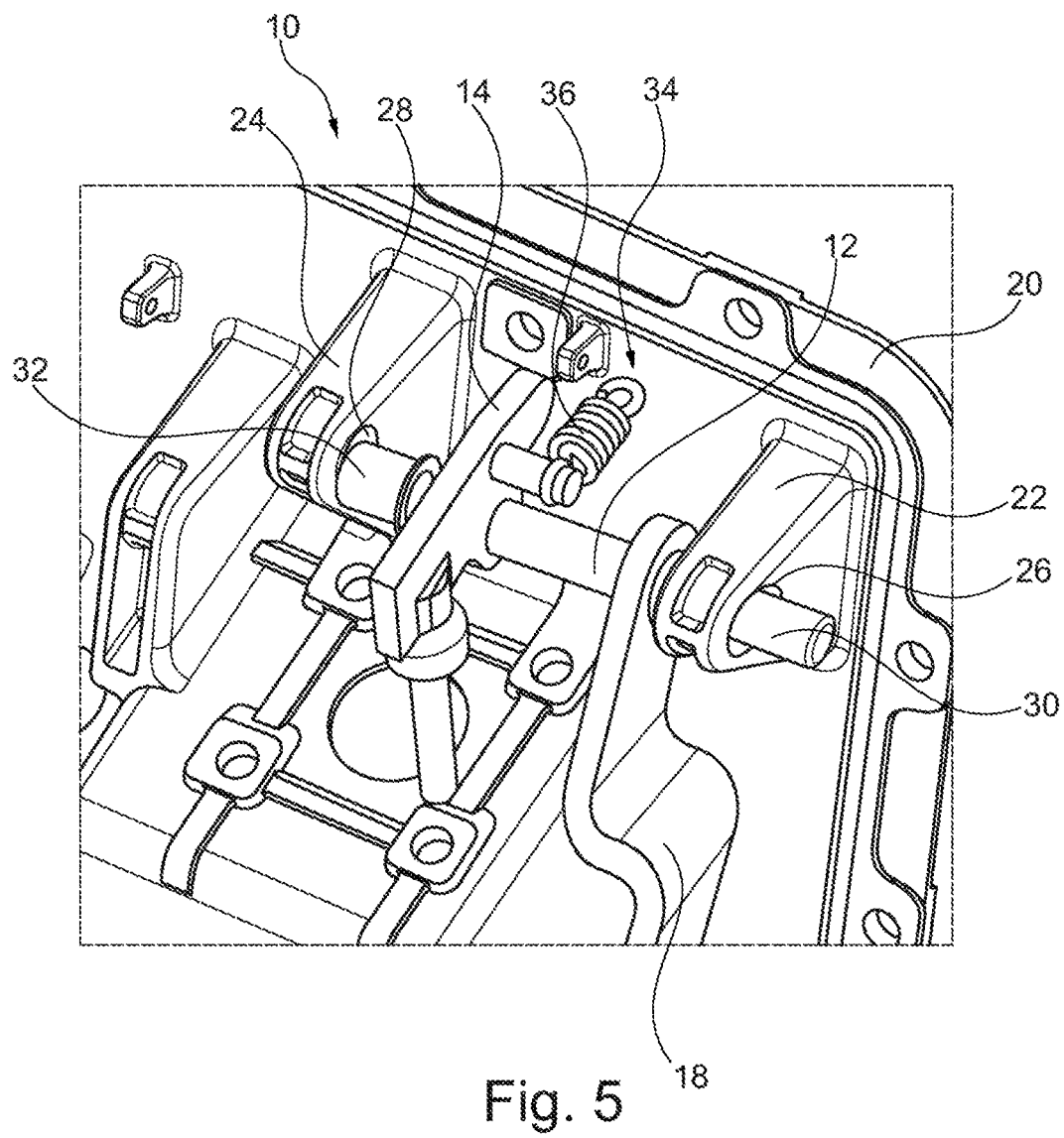
FIG. 5 is a further perspective view of the assembly process for the pedal unit of FIG. 1.
Figure 6:
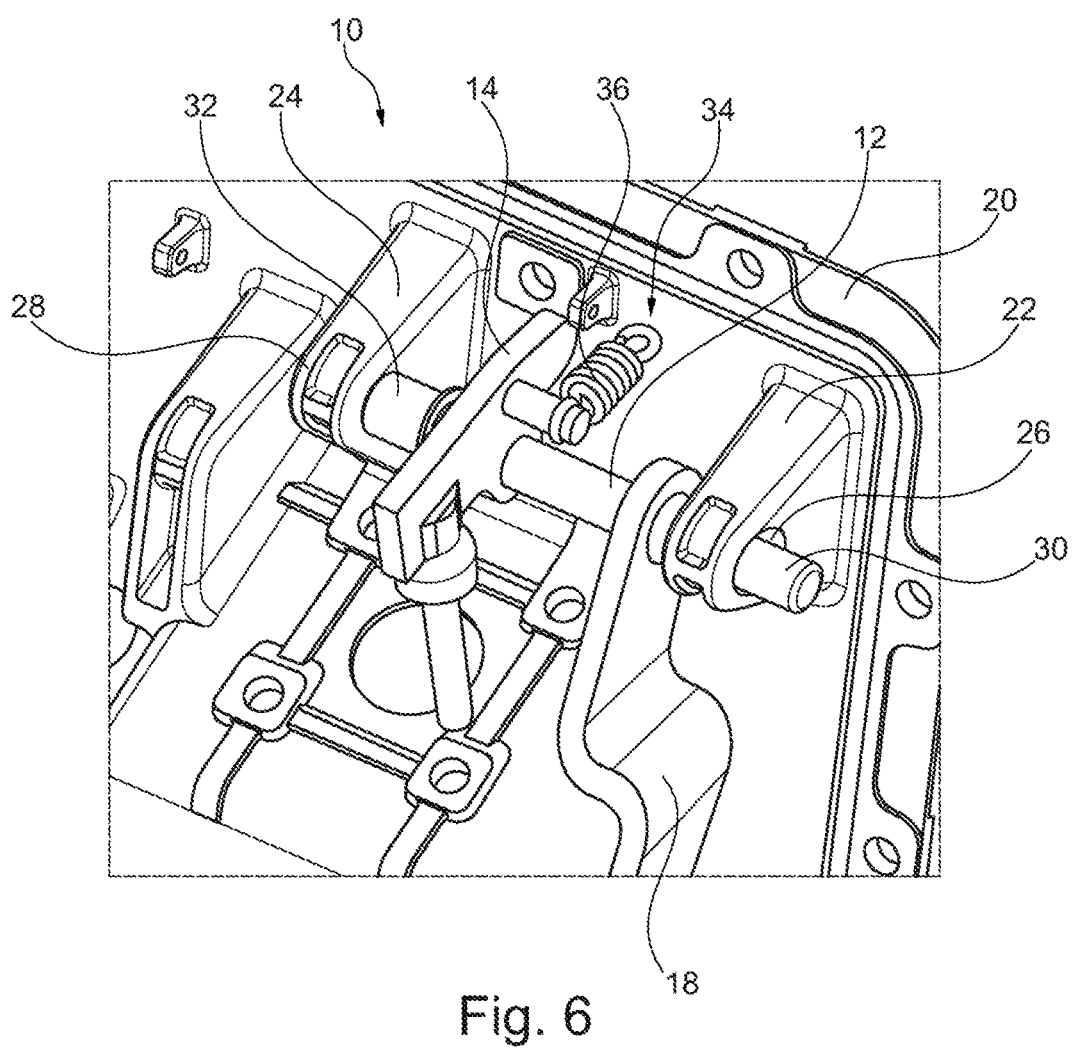
FIG. 6 is a further perspective view of the assembly process for the pedal unit of FIG. 1.

The pedal unit 10 includes a pedal shaft 12, a control cam 14, a pedal 16 (see FIG. 2) and a lever arm 18.

Furthermore, the pedal unit 10 includes a pedal plate 20, having a first shaft mount 22 and a second shaft mount 24.

The first shaft mount 22 has a first opening 26 and the second shaft mount 24 has a second opening 28.

Secured firmly on the pedal shaft 12 are the pedal 16 by way of a lever arm 18 and the control cam 14.

The pedal 16 is secured to the lever arm 18 by means of a suitable firm connection on the lever arm 18, e.g. by means of a screw connection, a plug-in connection, or the like.

The lever arm 18 is pressed onto the pedal shaft 12 and then welded at one end to the fastening site. A two-ended weld seam is also contemplated. Alternatively, screw connections, solder connections, or the like, are also possible.

The control cam 14 is fastened similar to the lever arm 18 on the pedal shaft 12. Here as well, the control cam 14 is welded to the pedal shaft 12 at the fastening site by use of a single-ended weld seam. A two-ended weld seam is also usable. Alternatively, screw connections, solder connections, or the like, are also possible.

The pedal shaft 12 is provided at both ends with a first pedal shaft bearing section 30 and a second pedal shaft bearing section 32.

The first pedal shaft bearing section 30 is provided for inserting into the opening 26 of the first shaft mount 22.

The second pedal shaft bearing section 32 is provided for inserting into the opening 28 of the second shaft mount 24.

Furthermore, a restoring element 34 is provided, by which the pedal unit can be returned to a neutral position when the pedal 16 is no longer under load.

The restoring element 34 has a return spring 36.

The return spring 36 engages on the one hand with the pedal plate 20 and on the other hand with the control cam 14.

FIGS. 2 to 6 show the assembly process of the pedal shaft 12 with the control cam 14 and pedal 16 with lever arm 18 firmly fastened to it.

First of all, the pedal shaft 12 is introduced at a slant into the opening 26 of the first shaft mount 22, i.e., with an angle of attack greater than zero, and specifically far enough so that the second pedal shaft bearing section 32 of the pedal shaft 12 at the opposite end of the first pedal shaft bearing section 30 of the pedal shaft 12 is situated between the first shaft mount 22 and the second shaft mount 24.

The second pedal shaft bearing section 32 is then introduced into the opening 28 of the second shaft mount 24.

Both the first pedal shaft bearing section 30 and the second pedal shaft bearing section 32 are then rotatably mounted and fixed with the bearing bushings in the respective openings 26 and 28.

Here, the bearing bushing for the first pedal shaft bearing section 30 and the opening 26 of the first shaft mount 22 are adapted by their outer contour to the inner cross section of the opening 26 of the first shaft mount 22, so that the pedal shaft bearing section 30 is also mounted there in an accordingly defined rotatable manner.

LIST OF REFERENCE NUMBERS

10 Pedal unit
12 Pedal shaft
14 Control cam
16 Pedal
18 Lever arm
20 Pedal plate
22 First shaft mount
24 Second shaft mount
26 First opening
28 Second opening
30 First pedal shaft bearing section
32 Second pedal shaft bearing section
34 Restoring element
36 Return spring The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pedal unit for a vehicle, comprising:
   at least one pedal shaft;
   at least one control cam;
   at least one pedal and at least one lever arm,
   wherein the pedal is firmly secured by way of the lever arm to the pedal shaft and wherein the control cam is firmly secured to the pedal shaft; and
   a pedal plate with a first shaft mount and a second shaft mount,
   wherein the pedal shaft is mounted by way of the first and second shaft mounts on the pedal plate, wherein the first shaft mount has a first opening with a cross section that is larger than the cross section of a first pedal shaft bearing section of the pedal shaft, by which the fully assembled pedal shaft is introducible into the first shaft mount during an assembly process, and wherein the cross section of the first opening is oval,
   wherein the second shaft mount comprises a second opening which forms a fit with a second pedal shaft bearing section of the pedal shaft and wherein the fit is formed by a bore with a circular cross section.

2. The pedal unit as claimed in claim 1, further comprising:
   a bearing bushing arranged at one end of the pedal shaft.

3. The pedal unit as claimed in claim 1, wherein the pedal shaft with the first pedal shaft bearing section is introducible at a slant into the first opening.

4. The pedal unit as claimed in claim 3, wherein the first pedal shaft bearing section of the pedal shaft in a mounted condition of the pedal unit is held by an insert bushing in the first opening of the first shaft mount.

5. The pedal unit as claimed in claim 1, wherein the first pedal shaft bearing section of the pedal shaft in a mounted condition of the pedal unit is held by an insert bushing in the first opening of the first shaft mount.

6. The pedal unit as claimed in claim 1, wherein the pedal unit is a utility vehicle pedal unit.

* * * * *